United States Patent
Kray et al.

(10) Patent No.: US 10,328,639 B2
(45) Date of Patent: Jun. 25, 2019

(54) METHOD AND SYSTEM FOR VARIABLE HEAT SOURCES FOR COMPOSITE FIBER PLACEMENT

(71) Applicant: General Electric Company, Schenectady, NY (US)

(72) Inventors: Nicholas Joseph Kray, Mason, OH (US); Stefaan Guido Van Nieuwenhove, Bavaria (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 554 days.

(21) Appl. No.: 15/017,104

(22) Filed: Feb. 5, 2016

(65) Prior Publication Data
US 2017/0225407 A1    Aug. 10, 2017

(51) Int. Cl.
B29C 35/02 (2006.01)
B29C 35/08 (2006.01)
(Continued)

(52) U.S. Cl.
CPC ........ B29C 70/388 (2013.01); B29C 35/0277 (2013.01); B29C 35/0288 (2013.01);
(Continued)

(58) Field of Classification Search
CPC ............ B29C 35/0277; B29C 35/0288; B29C 35/0805; B29C 2035/0822;
(Continued)

(56) References Cited

U.S. PATENT DOCUMENTS 2,169,288 A   8/1939   Reynolds
4,569,716 A   2/1986   Pugh
(Continued)

FOREIGN PATENT DOCUMENTS

EP   2231374 A2   9/2010
EP   1820626 B1   12/2011
(Continued)

OTHER PUBLICATIONS

Extended European Search Report and Opinion issued in connection with corresponding EP Application No. 17154554.4 dated Jul. 3, 2017.

Primary Examiner — Michael A Tolin
(74) Attorney, Agent, or Firm — General Electric Company; Kristi Davidson (57) ABSTRACT

An automated fiber placement (AFP) system includes a tool head with a compaction roller and a first variable heat source. The compaction roller is configured to receive at least one of a fiber and a plurality of fibers formed as a laydown tape, and is controlled to apply the laydown tape to a workpiece at a predetermined speed and direction. The first variable heat source is configured to apply a first amount of heat to the laydown tape. The first amount of heat applied is related to the predetermined speed. The AFP system further includes a second variable heat source configured to apply a second amount of heat to the workpiece. The second amount of heat applied is related to at least one of: a position on the workpiece, a thickness of the workpiece at that position, and a separation distance between the second variable heat source and the workpiece.

7 Claims, 6 Drawing Sheets

(51) Int. Cl.
*B29C 65/02* (2006.01)
*B29C 65/14* (2006.01)
*B29C 65/18* (2006.01)
*B29C 70/38* (2006.01)
*B29C 65/00* (2006.01)

(52) U.S. Cl.
CPC .......... *B29C 65/1412* (2013.01); *B29C 65/18* (2013.01); *B29C 66/0242* (2013.01); *B29C 66/3462* (2013.01); *B29C 66/3464* (2013.01); *B29C 66/8362* (2013.01); *B29C 66/91641* (2013.01); *B29C 66/932* (2013.01); *B29C 66/954* (2013.01); *B29C 66/961* (2013.01); *B29C 70/384* (2013.01); *B29C 35/0805* (2013.01); *B29C 2035/0822* (2013.01)

(58) Field of Classification Search
CPC ............ B29C 2035/0838; B29C 65/14; B29C 65/1412; B29C 65/1432; B29C 65/1445; B29C 65/1467; B29C 65/16; B29C 65/1612; B29C 65/1632; B29C 65/1645; B29C 65/1667; B29C 65/18; B29C 65/20; B29C 66/0242; B29C 66/3462; B29C 66/3464; B29C 66/83411; B29C 66/8362; B29C 66/91221; B29C 66/91411; B29C 66/9161; B29C 66/91641; B29C 66/932; B29C 66/954; B29C 66/961; B29C 70/34; B29C 70/38; B29C 70/382; B29C 70/384; B29C 70/386; B29C 70/388

See application file for complete search history.

(56) References Cited

U.S. PATENT DOCUMENTS

| | | | |
|---|---|---|---|
| 5,700,347 | A | 12/1997 | McCowin |
| 5,954,917 | A | 9/1999 | Jackson et al. |
| 7,341,086 | B2 | 3/2008 | Nelson et al. |
| 7,731,816 | B2 | 6/2010 | Oldani et al. |
| 8,388,884 | B2 | 3/2013 | Nelson et al. |
| 2003/0102070 | A1* | 6/2003 | Black .................. B29C 35/0288 156/64 |
| 2005/0109451 | A1 | 5/2005 | Hauber et al. |
| 2017/0095985 | A1 | 4/2017 | Engel et al. |

FOREIGN PATENT DOCUMENTS

| | | | |
|---|---|---|---|
| EP | 3 153 292 A1 | 4/2017 | |
| GB | 2094709 A * | 9/1982 | ............ B32B 37/06 |
| WO | 03/047845 A1 | 6/2003 | |
| WO | 2009077439 A2 | 6/2009 | |
| WO | 2009/103981 A1 | 8/2009 | |
| WO | 2014/029969 A1 | 2/2014 | |

* cited by examiner

METHOD AND SYSTEM FOR VARIABLE HEAT SOURCES FOR COMPOSITE FIBER PLACEMENT

BACKGROUND

The field of the disclosure relates generally to gas turbine engines and, more particularly, to a method and system for producing composite parts for gas turbine engines by applying composite fibers in an automated fiber placement process.

Figure 1A:
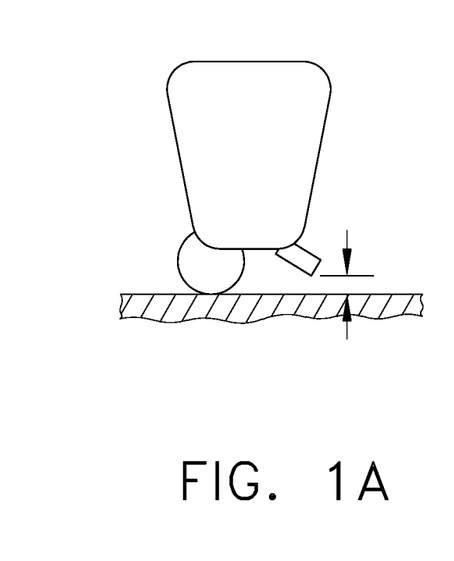
FIGS. 1A, 1B, and 1C are schematic illustrations of an existing automated fiber placement (AFP) system operating over a level workpiece surface (FIG. 1A), a convex workpiece surface (FIG. 1B), and a concave workpiece surface (FIG. 1C)
Figure 1B:
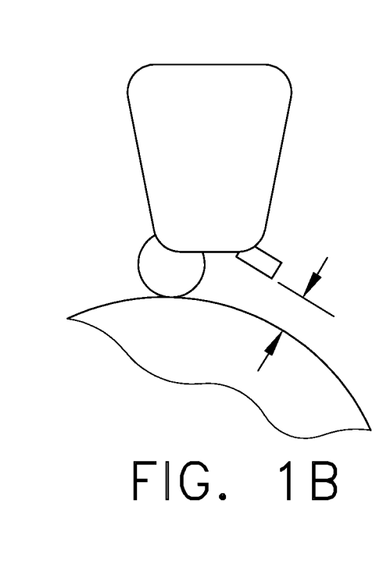
Figure 1C:
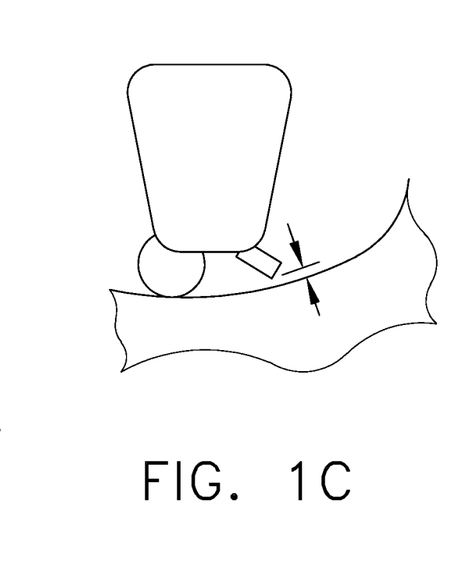

Composite fiber placement has become increasingly used for the manufacture of composite parts. Automatic fiber placement (AFP) devices may be used to reduce the cost and manufacturing time associated with the production of composite parts, as well as to enhance the quality of the composite parts produced using these devices. Some existing AFP devices have incorporated heating elements, such as quartz lamps, to heat the workpiece material forward of the laydown tape in order to enhance the compaction and workability of the material. However, existing heated AFP tools heat the workpiece surface at a fixed rate and fixed location relative to the AFP tool head. As the laminate tape is applied, the heat source moves farther away from the laydown surface, resulting in cooling of the laminate after the AFP tool head has passed. In addition, the separation distance between the heating elements of some existing AFP devices and the workpiece surface may vary depending on whether the AFP tool head is passing over a level workpiece surface (see FIG. 1A), a convex workpiece surface (see FIG. 1B), or a concave workpiece surface (see FIG. 1C), resulting in different degrees of heating of the workpiece surface. This existing method of heating cannot compensate for sudden changes in the speed at which the composite fibers are applied, variations in separation distance between heating elements and workpiece surface due to variations in workpiece surface contours, or for differences in thickness of the workpiece upon which the laydown tape is applied.

BRIEF DESCRIPTION

In one aspect, an automated fiber placement (AFP) system includes a tool head with a compaction roller configured to receive at least one of a fiber and a plurality of fibers formed as a laydown tape, a first variable heat source configured to apply a first amount of heat to the laydown tape, and a second variable heat source configured to apply a second amount of heat to the workpiece. The compaction roller is controlled to apply the laydown tape to a workpiece at a predetermined speed and at a predetermined direction. The first amount of heat applied to the laydown tape is related to the predetermined speed. The second amount of heat applied to the workpiece is related to at least one of: a position on the workpiece, a thickness of the workpiece at the position and a separation distance between the second variable heat source and the workpiece.

In another aspect, a method of producing a composite part using an automated fiber placement (AFP) system includes receiving at least one of a fiber and a plurality of fibers formed as a laydown tape at a compaction roller of a tool head of the AFP system. The method further includes applying the laydown tape to a workpiece using the compaction roller at a predetermined speed and at a predetermined direction, applying a first amount of heat to the laydown tape from a position proximate one of the compaction roller and the laydown tape using a first variable heat source of the AFP system. The first amount of heat applied is related to the predetermined speed. The method additionally includes applying a second amount of heat to the workpiece using a second variable source of heat of the AFP. The applied second amount of heat is applied related to a position on the workpiece and a relative thickness of the workpiece at that position.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

Embodiments of the automated fiber placement (AFP) systems described herein provide a rapid and cost-effective method for producing a composite part suitable, for example, for use in a gas turbine engine. The AFP systems include at least two variable heat sources controlled using feedback control loops to enhance the compaction and workability of the laminate material, thereby reducing the occurrence of flaws in the workpiece including, but not limited to, voids between adjacent layers of the workpiece.

Figure 2:
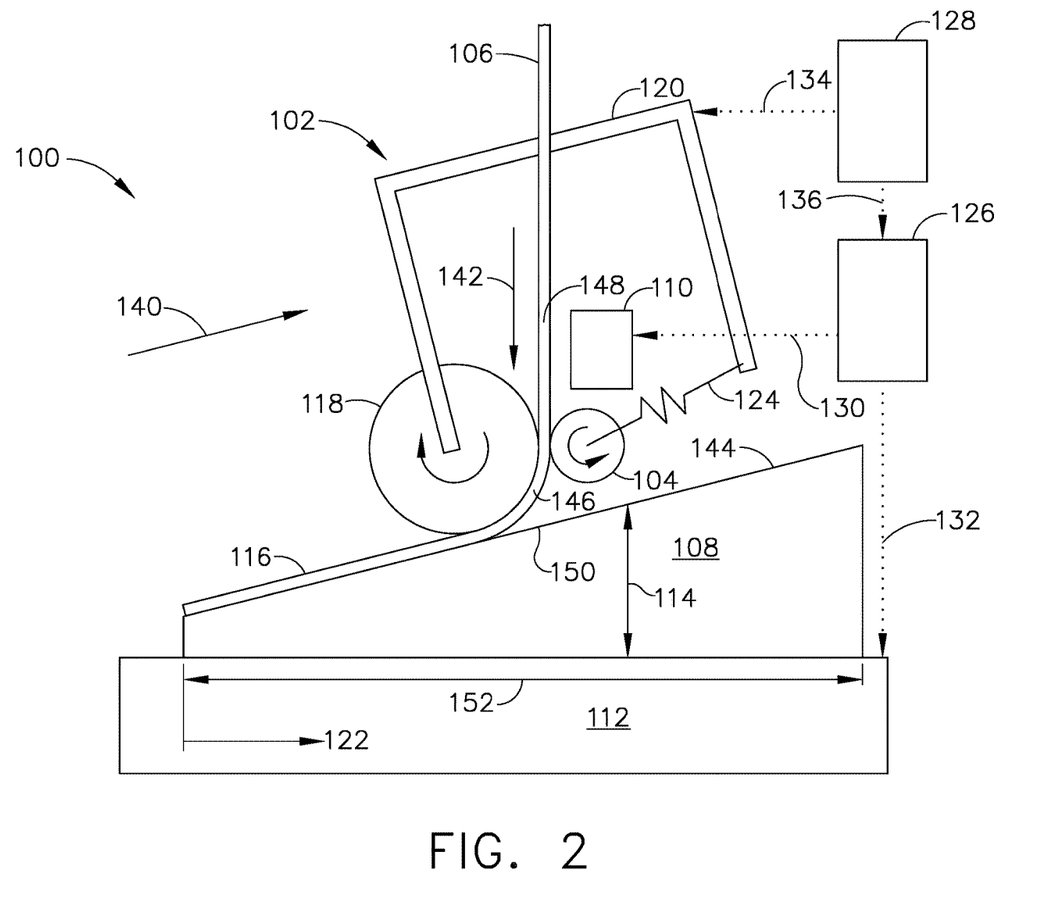
FIG. 2 is a schematic illustration of an exemplary automated fiber placement (AFP) system in accordance with an example embodiment of the present disclosure.

FIG. 2 is a schematic illustration of an exemplary automated fiber placement (AFP) system 100 in an exemplary embodiment. The AFP system 100 includes a tool head 102 configured to receive at least one of a fiber and a plurality of fibers formed as a laydown tape 106 and to apply the laydown tape 106 to a workpiece 108 to form a composite part (not shown).

Referring again to FIG. 2, tool head 102 further includes a compaction roller 118 and a thermal roller 104 mounted on a frame 120. Compaction roller 118 and thermal roller 104 are configured to receive laydown tape 106 therebetween. As tool head 102 translates in a forward direction 140, laydown tape 106 is pulled in a downward direction 142 between compaction roller 118 and thermal roller 104. As tool head 102 continues to translate in forward direction 140, laydown tape 106 is compressed against surface 144 of workpiece 108 by compaction roller 118 to form a laminate layer 116 upon workpiece 108.

In this exemplary embodiment, thermal roller 104 is provided with a spring element 124 attached at opposed ends to frame 120 and thermal roller 104. Spring element 124 is configured to compress thermal roller 104 against compaction roller 118 to maintain a tension within laydown tape 106 between surface 144 of workpiece 108 and compaction roller 118, thereby enabling laydown tape 106 to be applied to surface 144 of workpiece 108 without flaws including wrinkles and/or puckers that may degrade the finished composite part formed by AFP system 100. In addition, compression of thermal roller 104 against compaction roller 118 by spring element 124 enables compaction roller 118 and thermal roller 104 to rotate without slipping, thereby maintaining thermal roller 104 and adjacent laydown tape 106 in intimate contact.

In various aspects, compaction roller 118 of tool head 102 is controlled to apply laydown tape 106 at a predetermined speed and at a predetermined direction to workpiece 108. In one aspect, the predetermined speed and direction are controlled based on at least one characteristic of workpiece 108 including, but not limited to, the size and shape of workpiece 108, the desired orientation of fiber or plurality of fibers of laydown tape 106, the number of fibers in laydown tape 106, and any combination thereof. In another embodiment, AFP system 100 further includes a head path controller 128 configured to control the speed and direction of movement of tool head 102. In this embodiment, head path controller 128 controls the movements of tool head 102 according to predetermined instructions executed by head path controller 128. The predetermined instructions executed by head path controller 128 produce one or more signals 134 encoding a series of movements of tool head 102 to enable the layup of a plurality of segments of laydown tape 106 as desired to form finished workpiece 108 suitable for use as a composite part. In another embodiment, head path controller 128 modifies the movements of tool head 102 to compensate for changes in size and shape of workpiece 108 resulting from the build-up of layers of laydown tape 106 during fabrication of the composite part.

In other embodiments, head path controller 128 tracks at least one parameter characterizing the position 122 and orientation of tool head 102 with respect to workpiece 108. In one embodiment, head path controller 128 tracks a position 122 of tool head 102 on workpiece 108. In another embodiment, head path controller 128 tracks a thickness 114 of workpiece 108 at each position 122. In this embodiment, head path controller 128 updates thickness 114 as tool head 102 applies laydown tape 106 to workpiece 108 during fabrication of the composite part.

Figure 3:
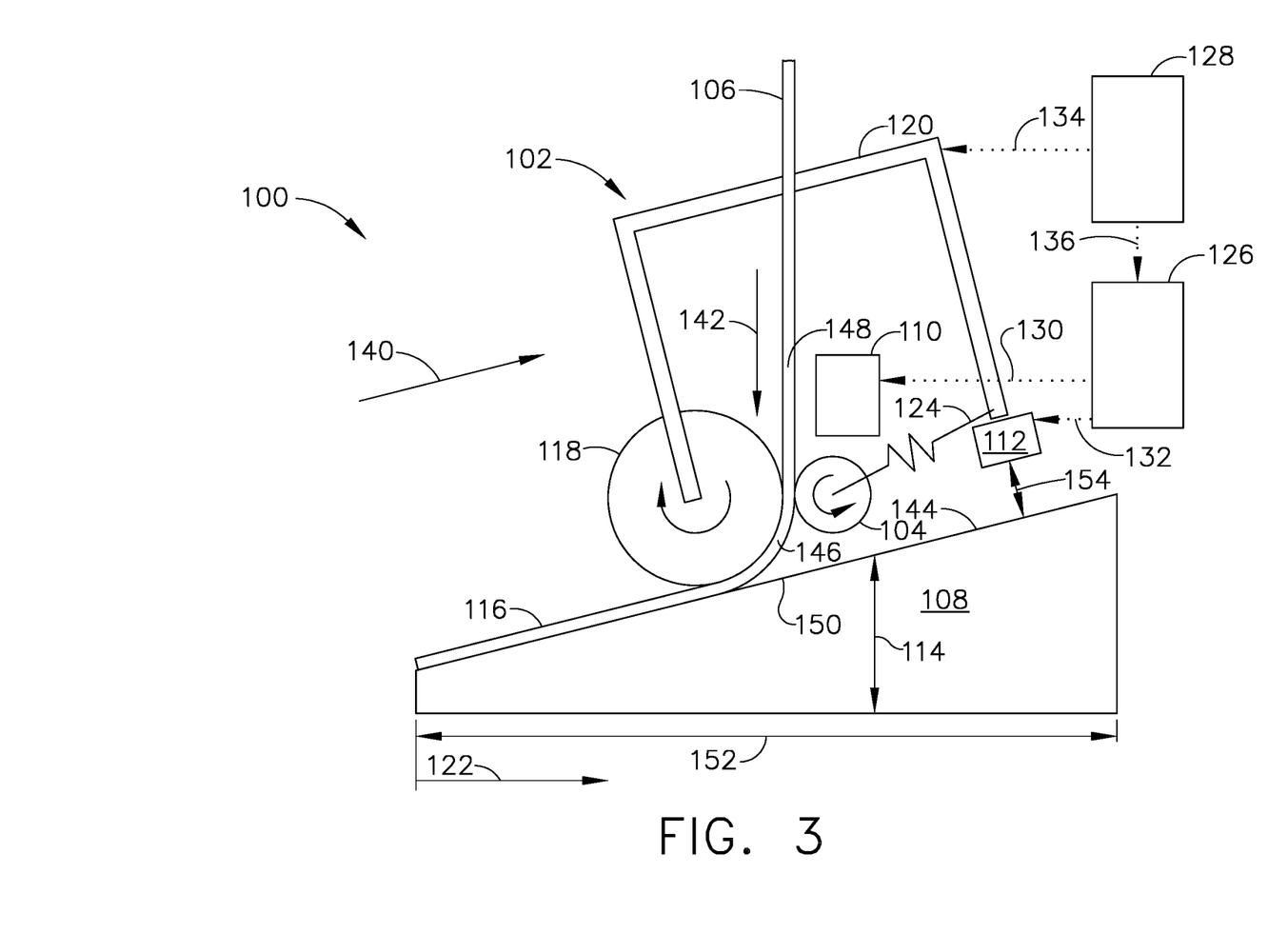
FIG. 3 is a schematic illustration of an exemplary automated fiber placement (AFP) system in accordance with a second example embodiment of the present disclosure.

Referring again to FIG. 2, AFP system 100 is provided with at least two variable heat sources 110, 112 to heat laydown tape 106 and/or workpiece 108 as laydown tape 106 is applied to workpiece 108. Without being limited to any particular theory, it is thought that heating laydown tape 106 and/or workpiece 108 improves both compaction and workability of the material of laydown tape 106 and workpiece 108, resulting in less flaws including, but not limited to, voids, wrinkles, puckers, and/or folds in the composite part formed by AFP system 100. In various embodiments, AFP system 100 includes a first variable heat source 110 and a second variable heat source 112. First variable heat source 110 and second variable heat source 112 may be situated anywhere within AFP system 100 without limitation. In one embodiment, first and second variable heat sources 110, 112 are situated on the same side of workpiece 108, as illustrated in FIG. 3. In the exemplary embodiment illustrated in FIG. 2, first and second variable heat sources 110, 112 are situated on opposite sides of workpiece 108. First variable heat source 110 and second variable heat source 112 are any known suitable heat source including, but not limited to, electromagnetic heat sources such as infrared heat lamps.

In the exemplary embodiment illustrated in FIG. 2, first variable heat source 110 is configured to apply a first amount of heat to laydown tape 106 from a position proximate one of thermal roller 104 or laydown tape 106. In one aspect, the thermal roller 104 is heated by first variable heat source 110. The heated thermal roller 104, which is situated proximate to compaction roller 118 and pressed in intimate contact with laydown tape 106 by spring element 124, applies first amount of heat to laydown tape 106 at a first laydown tape segment 146 situated between thermal roller 104 and compaction roller 118. In another aspect, first variable heat source 110 applies first amount of heat directly to laydown tape 106 from a position proximate laydown tape 106 at a second laydown tape segment 148 situated above thermal roller 104 and compaction roller 118.

In one aspect, the first amount of heat applied to laydown tape 106 by first variable heat source 110 is related to the predetermined speed at which compaction roller 118 moves relative to workpiece 108. In this aspect, first amount of heat is modulated to achieve the application of a constant first amount of heat to laydown tape 106 as laydown tape 106 is applied to workpiece 108. By way of non-limiting example, when tool head 102 is moving along a relatively long path, the predetermined speed of compaction roller 118 may be higher relative to movements along shorter paths on workpiece 108. To transfer a similar first amount of heat at this higher predetermined speed, first variable heat source 110 applies a higher first amount of heat during the movement at the higher predetermined speed. Conversely, first variable heat source 110 applies a lower first amount of heat during movements of compaction roller 118 at lower predetermined speeds to maintain a similar amount of heat transfer to laydown tape 106.

Figure 4:
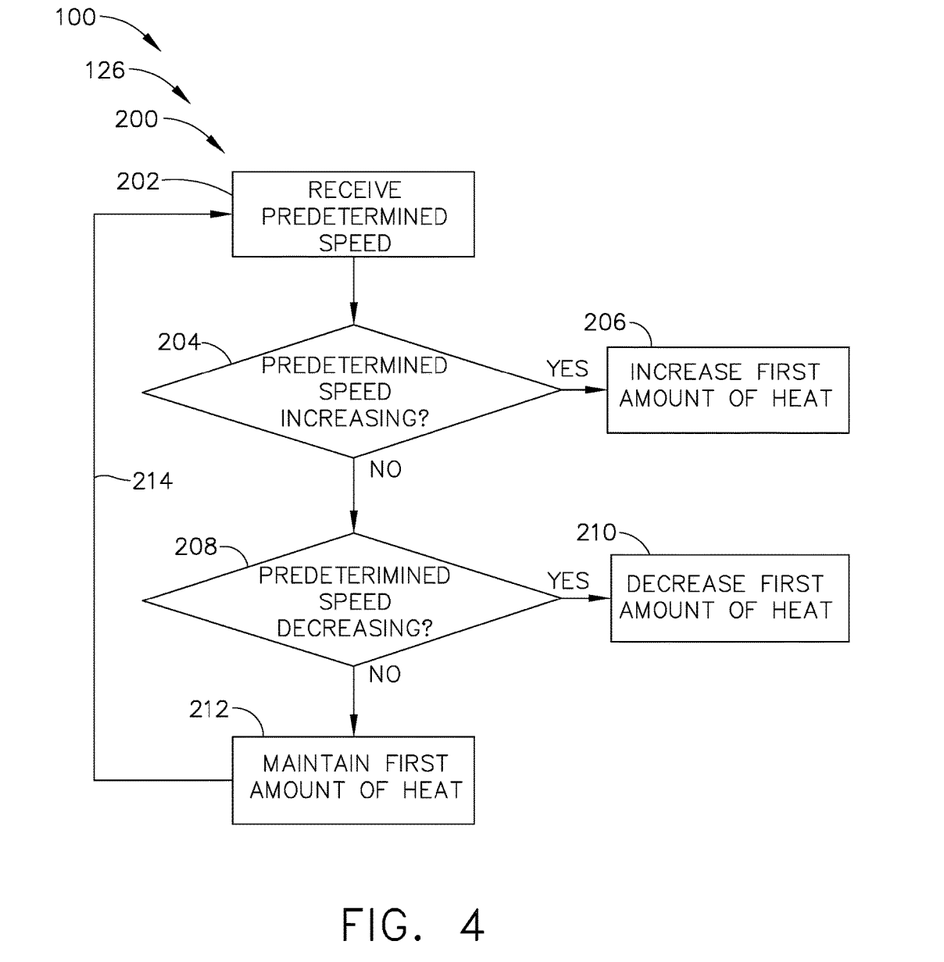
FIG. 4 is a flow chart illustrating the steps of a first closed loop in accordance with an example embodiment of the present disclosure.

Referring again to FIG. 2, AFP system 100 further includes a heat controller 126 configured to control the operation of first variable heat source 110 in various aspects. The operation of first variable heat source 110 is modulated via one or more control signals 130 received from heat controller 126 according to a control scheme. In one aspect, heat controller 126 includes a first feedback loop configured to control the first amount of heat applied by first variable heat source 110. FIG. 4 is a flow chart showing the steps performed in first feedback loop 200 in one exemplary embodiment. First feedback loop 200 includes receiving 202 predetermined speed of compaction roller 118 relative to workpiece 108. In one aspect, heat controller 126 receives 202 a feedback signal 136 encoding predetermined speed from head path controller 128. In other aspects, AFP system 100 further includes one or more speed sensors (not shown) configured to measure predetermined speed to be received 202 by heat controller 126. Non-limiting examples of suitable speed sensors include: position sensors or accelerometers mounted to tool head 102, rotation sensor mounted to compaction roller 118, and any other known speed sensor.

Referring again to FIG. 4, first feedback loop 200 further includes determining 204 whether the predetermined speed is increasing. If the determined speed is increasing, first feedback loop increases 206 the first amount of heat applied to laydown tape 106. If the predetermined amount of speed is not increasing, first feedback loop determines 208 whether the predetermined speed is decreasing. If the predetermined speed is decreasing, first feedback loop 200 decreases 210 first amount of heat applied to laydown tape 106. If predetermined speed is neither increasing nor decreasing, first feedback loop 200 maintains 212 the first amount of heat applied to laydown tape 106 at the previous level. In another aspect, first feedback loop 200 updates 214 by receiving 202 and assessing 204, 208 an updated predetermined speed as described previously.

In another embodiment (not shown), first feedback loop 200 modulates the first amount of heat applied to laydown tape 106 based on a temperature of first laydown tape segment 146. In this embodiment, first feedback loop 200 increases the first amount of heat applied to laydown tape 106 if the temperature of first laydown tape segment 146 falls below a predetermined temperature range. Conversely, first feedback loop 200 decreases the first amount of heat applied to laydown tape 106 if the temperature of first laydown tape segment 146 falls above a predetermined temperature range. In other embodiments, the temperature of first laydown tape segment 146 is measured by a temperature sensor (not shown) provided in AFP system 100 including, but not limited to: an infrared sensor, a thermocouple, and any other known suitable temperature sensor.

Referring again to FIG. 2, second variable heat source 112 is configured to apply a second amount of heat to workpiece 108. In one aspect, second variable heat source 112 transfers heat into workpiece 108 to maintain a predetermined temperature at surface 144 of workpiece 108 to enhance workability and compaction of workpiece 108 as laydown tape 106 is applied to surface 144. In another aspect, the second amount of heat applied to workpiece 108 is related to position 122 on workpiece 108 and to thickness 114 of workpiece at each position 122. Without being limited to any particular theory, a thicker workpiece 108 requires relatively more heat to achieve a predetermined temperature compared to a thinner workpiece 108 due to the greater amount of material in the thicker workpiece 108. In one aspect, the second amount of heat applied at a position 122 on workpiece 108 is increased for larger thicknesses and is decreased for smaller thicknesses.

In one embodiment, shown in FIG. 2, first variable heat source 110 and second variable heat source 112 are situated on opposite sides of workpiece 108. In another embodiment, illustrated in FIG. 3, first variable heat source 110 and second variable heat source 112 are situated on the same side of workpiece 108. In this other embodiment, the second amount of heat may further due to differences in a separation distance 154 caused by a variety of factors including, but not limited to variations in the surface profile of surface 144 of workpiece 108 and the orientation of tool head 102 relative to surface 144 of workpiece 108.

Figure 5:
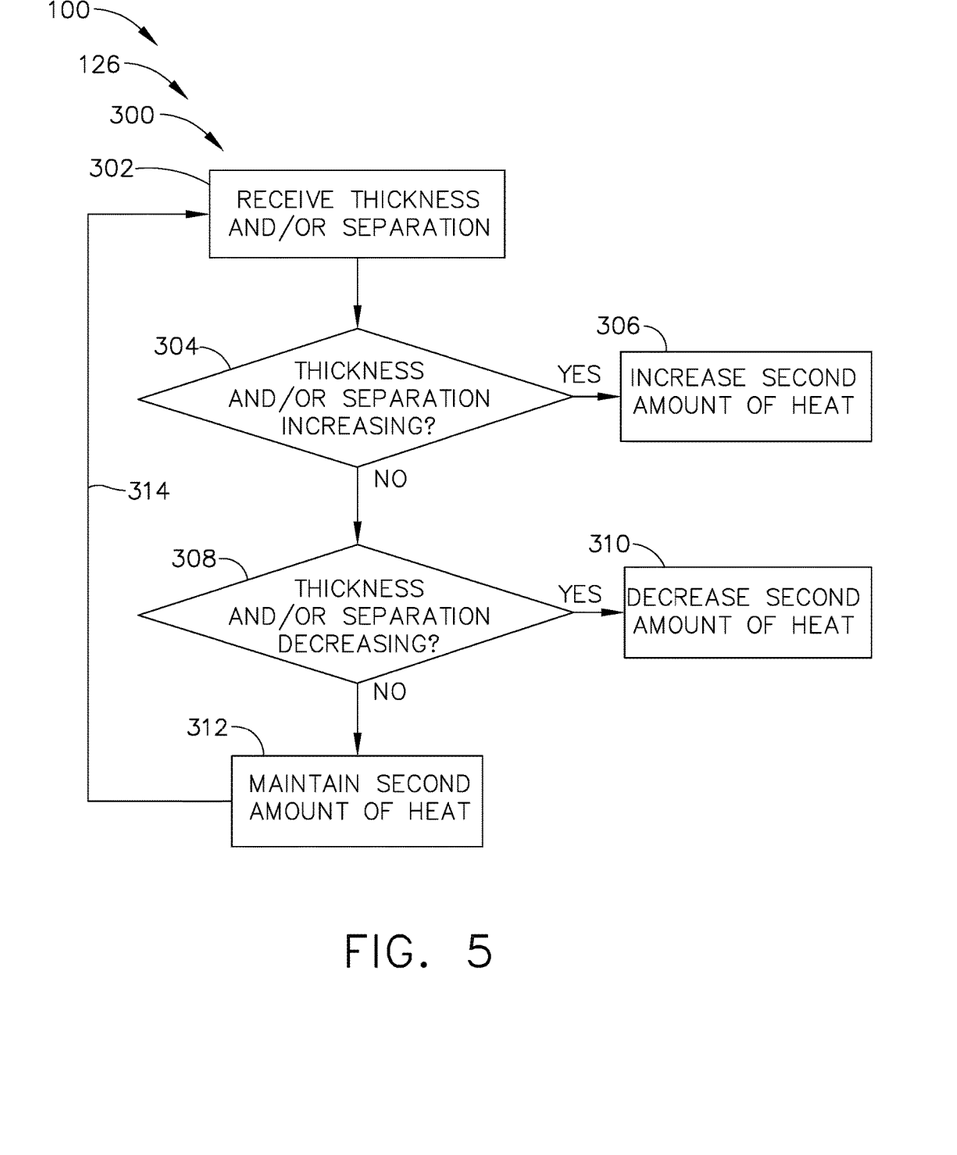
FIG. 5 is a flow chart illustrating the steps of a second closed loop in accordance with an example embodiment of the present disclosure.

Referring again to FIG. 2, the operation of second variable heat source 112 is modulated via one or more control signals 132 received from heat controller 126 according to a control scheme. Heat controller 126 further includes a second feedback loop configured to control the second amount of heat applied by second variable heat source 112. FIG. 5 is a flow chart showing the steps performed in second feedback loop 300 in one exemplary embodiment. Second feedback loop 300 includes receiving 302 thickness 114 of workpiece 108 and/or separation distance 154 between second variable heat source 112 and surface 144 of workpiece 108 at current position 122 of compaction roller 118. In one aspect, illustrated in FIG. 2 and FIG. 3, heat controller 126 receives at least one feedback signal 136 encoding at least one of position 122, thickness 114, and any combination thereof from head path controller 128. In other aspects, AFP system 100 further include one or more sensors (not shown) configured to measure thickness 114 and/or separation distance 154 to be communicated to heat controller 126. Non-limiting examples of suitable sensors include: position sensors, proximity sensors, ultrasonic sensors, and any other known sensor suitable for measuring thickness 114 and/or separation distance 154.

Referring again to FIG. 5, second feedback loop 300 further includes determining 304 whether thickness 114 and/or separation distance 154 of workpiece 108 is increasing as tool head 102 moves over workpiece 108. If thickness 114 and/or separation distance 154 is increasing, second feedback loop 300 increases 306 the second amount of heat applied to workpiece 108. If thickness 114 and/or separation distance 154 is not increasing, second feedback loop 300 determines 308 whether thickness 114 and/or separation distance 154 is decreasing. If thickness 114 and/or separation distance 154 is decreasing, second feedback loop 300 decreases 310 second amount of heat applied to workpiece 108. If thickness 114 and/or separation distance 154 is neither increasing nor decreasing, second feedback loop 300 maintains 312 the second amount of heat applied to workpiece 108 at the previous level. Second feedback loop 300 is updated 314 as new information regarding the current thickness 114 and/or separation distance 154 is received 302 and assessed as described previously.

In another embodiment (not shown), second feedback loop 300 modulates the second amount of heat applied to workpiece 108 based on a temperature of a region 150 of surface 144 of workpiece 108. In this embodiment, second feedback loop 300 increases the second amount of heat applied to workpiece 108 if the temperature of region 150 falls below a predetermined temperature range. Conversely, second feedback loop 300 decreases the second amount of heat applied to workpiece 108 if the temperature of region 150 falls above a predetermined temperature range. In other embodiments, the temperature of region 150 is measured by a temperature sensor (not shown) provided in AFP system 100 including, but not limited to: an infrared sensor, a thermocouple, and any other known suitable temperature sensor.

In various embodiments, second variable heat source 112 extends over at least a portion of a length 152 of workpiece 108. In one embodiment, second variable heat source extends over a limited portion of workpiece 108. In this embodiment, second variable heat source 112 is further configured to translate along workpiece 108 during operation of AFP system 100 so as to maintain a position proximate to region 150 on surface 144 of workpiece 108. In addition, second variable heat source 112 increases the second amount of heat applied to workpiece 108 as tool head 102 translates along workpiece 108 in proportion to changes in thickness 114 and/or separation distance 154 according to, by way of non-limiting example, second feedback loop 300 as described herein previously.

In another embodiment, second variable heat source 112 extends over the full length 152 of workpiece 108. In this embodiment, second variable heat source 112 is configured to apply heat at differing rates along length 152 of workpiece according to thickness 114 at each position 122. In one aspect, second variable heat source 112 is provided as an array of heating elements distributed along length 152 of workpiece 108. In this aspect, heat controller 126 controls each heating element of the array individually according to the local thickness 114 at each position 122 associated with each heating element in the array. In various other aspects, second variable heat source increases the second amount of heat applied to at least a portion of workpiece 108 as additional plies of laydown tape 106 are applied to surface 144 of workpiece, causing additional thickness of at least a portion of workpiece 108.

In various other embodiments, second variable heat source 112 is further configured to apply a third amount of heat to workpiece 108 upon completion of workpiece 108. The third amount of heat applied to completed workpiece 108 is sufficient to at least partially cure completed workpiece 108 into a composite part. In one aspect, the application of the third amount of heat is controlled by heat controller 126. In another aspect, second heat source applies a relatively constant third amount of heat to workpiece 108 for a predetermined cure time. In yet another embodiment, the second heat source may apply the third amount of heat at time-varying rates according to a predetermined curing schedule. In this embodiment, the heat controller 126 further includes the predetermined curing schedule used to control the application of the third amount of heat. In yet another embodiment, AFP system 100 may further include temperature sensors to monitor the temperature of workpiece 108 at one or more positions 122. In this embodiment, the monitored temperature of the workpiece 108 may be used to regulate the third amount of heat applied to workpiece 108 according to an additional feedback loop similar to second feedback loop 300 described previously.

Figure 6:
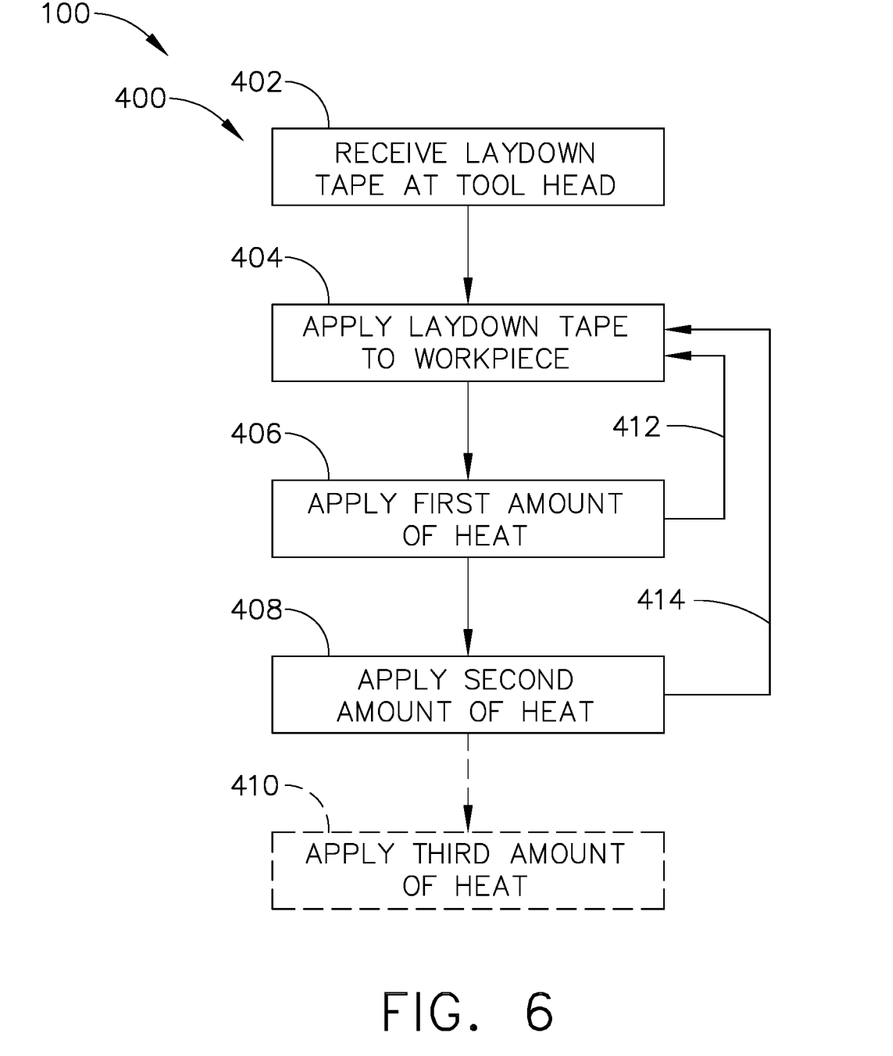
FIG. 6 is a flow chart illustrating a method of producing a composite part using an automated fiber placement (AFP) system in accordance with an example embodiment of the present disclosure.

The above-described AFP system 100 may be used in a method for producing a composite part. FIG. 6 is a flow chart illustrating an exemplary embodiment of a method 400 for producing a composite part in an exemplary embodiment. Method 400 includes receiving 402 laydown tape 106 at tool head 102 as described herein above, for example between compaction roller 118 and thermal roller 104. Method 400 further includes applying 404 laydown tape 106 to workpiece 108 at a predetermined speed and at a predetermined direction as described herein above. By way of non-limiting example, laydown tape 106 may be applied by moving compaction roller 118 at the predetermined speed and direction as controlled by head path controller 128 as described herein above.

Referring again to FIG. 6, method 400 further includes applying 406 the first amount of heat to laydown tape 106. By way of non-limiting example, the first amount of heat may be applied to first laydown tape segment 146 by thermal roller 104, which is heated by first variable heat source 110 situated in close proximity to thermal roller 104 as described herein previously and as illustrated in FIG. 2. In this example, the first amount of heat produced by first variable heat source 110 may be modulated by heat controller 126 according to a first feedback loop 200 to compensate for variations in the predetermined speed as described herein previously. The first amount of heat may be readjusted 412 as additional laydown tape 106 is applied 404 to workpiece 108. Any other suitable method of applying the first amount of heat to laydown tape 106 may be used in method 400 including, but not limited to, any of the devices, controls, and methods described herein previously.

Method 400 further includes applying 408 the second amount of heat to workpiece 108 using second variable heat source 112. The second amount of heat may be readjusted 414 as additional laydown tape 106 is applied 404 to workpiece 108. By way of non-limiting example, second variable heat source 112 may be an array of heating elements individually controlled by heat controller 126 as described herein previously. In this example, heat controller 126 may modulate the second amount of heat produced at each heating element of the array according to the second feedback loop 300 to compensate for variations in thickness 114 of workpiece 108 at different positions 122 along length 152 of workpiece 108, as described herein previously. Any other suitable method of applying the second amount of heat to workpiece 108 may be used in method 400 including, but not limited to, any of the devices, controls, and methods described herein previously.

Referring again to FIG. 6, method 400 optionally includes applying 410 a third amount of heat to workpiece 108 using second variable heat source 112. As described herein previously, third amount of heat may be applied to at least partially cure a completed workpiece 108 to produce the composite part.

The above-described automated fiber placement systems 100 provide an efficient method for producing composite parts for use as gas turbine engine components. Specifically, the above-described automated fiber placement system 100 includes a tool head 102 that applies laydown tape 106 that includes at least one of a fiber and a plurality of fibers to a workpiece 108, a first variable heat source 110 that applies a first amount of heat to laydown tape 106, and a second variable heat source 112 that applies a second amount of heat to the workpiece 108 according to various control schemes. Using the above-described automated fiber placement system 100, the first amount of heat applied to laydown tape 106 is controlled to compensate for variations in the predetermined speed at which laydown tape 106 is applied to workpiece 108, and the second amount of heat applied to workpiece 108 is continuously adjusted to compensate for differences in workpiece thickness 114 along the length 152 of the workpiece 108 and for changes in thickness 114 as successive plies of laydown tape 106 are applied to the workpiece 108.

An exemplary technical effect of the methods, systems, and apparatus described herein includes at least one of: (a) maintaining the laydown tape 106 and the surface 144 of the workpiece 108 within a predetermined temperature range that enhances the compaction and workability of the composite material, (b) enabling laydown tape temperature to be maintained at the predetermined temperature range throughout a range of predetermined speeds at which the laydown tape 106 is applied to the workpiece 108, (c) enabling workpiece surface temperature to be maintained at the predetermined temperature range throughout a range of workpiece thicknesses 114 and heterogeneity of workpiece thickness 114 along the length 152 of the workpiece 108, and (d) enhancing quality of the completed composite parts by reducing incidence of flaws such as wrinkles, or voids between layers of the composite parts.

Exemplary embodiments of automated fiber placement systems are described above in detail. The automated fiber placement systems, and methods of operating such systems and component devices are not limited to the specific embodiments described herein, but rather, components of the systems and/or steps of the methods may be utilized independently and separately from other components and/or steps described herein. For example, the methods may also be used to produce composite parts for any structure without limitation, and are not limited to practice with only the systems and methods as described herein. In addition, the exemplary embodiment can be implemented and utilized in connection with many other automated fiber placement devices that are currently configured to receive and apply laydown tape to workpieces to fabricate composite parts.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of producing a composite part using an automated fiber placement (AFP) system, the method comprising:
   receiving at least one of a fiber and a plurality of fibers formed as a laydown tape at a compaction roller of a tool head of the AFP system;
   applying the laydown tape to a workpiece using the compaction roller at a predetermined speed and at a predetermined direction;
   applying a first amount of heat to the laydown tape using a first variable heat source of the AFP system, wherein the first amount of heat applied is related to the predetermined speed and is controlled by a first feedback loop of a heat controller of the AFP system; and
   applying a second amount of heat to the workpiece using a second variable heat source of the AFP system, wherein the second amount of heat applied is controlled by a second feedback loop of the heat controller and is related to at least one of: a position on the workpiece, a thickness of the workpiece at the position, and a separation distance between the second variable heat source and the workpiece;
   receiving at the heat controller from a head path controller of the AFP system the position on the workpiece and at least one of the thickness of the workpiece and the separation distance between the second variable heat source and the workpiece at that position; and
   applying the second amount of heat according to the second feedback loop, the second feedback loop comprising increasing or decreasing the applied second amount of heat in proportion to increases or decreases of at least one of: each position on the workpiece, the thickness, and the separation distance.

2. The method of claim 1, further comprising:
   receiving the predetermined speed from the head path controller of the AFP system at the heat controller; and
   applying the first amount of heat according to the first feedback loop, the first feedback loop comprising increasing or decreasing the applied first amount of heat in proportion to increases or decreases in the predetermined speed.

3. The method of claim 1, further comprising:
   updating at least one of the thickness and the separation distance at each position of the workpiece as successive laydown tapes are applied to the workpiece by the head path controller; and
   applying the second amount of heat according to an updated second feedback loop, the updated second feedback loop comprising increasing or decreasing the applied second amount of heat in proportion to increases or decreases in at least one of the updated thickness and the updated separation distance.

4. The method of claim 1, further comprising applying the first amount of heat and the second amount of heat from opposite sides of the workpiece.

5. The method of claim 1, further comprising applying the first amount of heat to the laydown tape using the first variable heat source comprising a source of electromagnetic radiation directed toward the laydown tape.

6. A method of producing a composite part using an automated fiber placement (AFP) system, the method comprising:
   receiving at least one of a fiber and a plurality of fibers formed as a laydown tape at a compaction roller of a tool head of the AFP system;
   applying the laydown tape to a workpiece using the compaction roller at a predetermined speed and at a predetermined direction;
   applying a first amount of heat to the laydown tape using a thermal roller in contact with the laydown tape by heating the thermal roller with a first variable heat source, and wherein the first amount of heat applied is related to the predetermined speed; and
   applying a second amount of heat to the workpiece using a second variable heat source of the AFP system, wherein the second amount of heat applied is related to at least one of: a position on the workpiece, a thickness of the workpiece at the position, and a separation distance between the second variable heat source and the workpiece.

7. A method of producing a composite part using an automated fiber placement (AFP) system, the method comprising:
   receiving at least one of a fiber and a plurality of fibers formed as a laydown tape at a compaction roller of a tool head of the AFP system;

applying the laydown tape to a workpiece using the compaction roller at a predetermined speed and at a predetermined direction;

applying a first amount of heat to the laydown tape using a first variable heat source of the AFP system, wherein the first amount of heat applied is related to the predetermined speed;

applying a second amount of heat to the workpiece using a second variable heat source of the AFP system, wherein the second amount of heat applied is related to at least one of: a position on the workpiece, a thickness of the workpiece at the position, and a separation distance between the second variable heat source and the workpiece; and applying a third amount of heat to a completed workpiece with the second variable heat source to at least partially cure the completed workpiece.

\* \* \* \* \*